F. H. FRENCH.
TANDEM DISK HARROW.
APPLICATION FILED JULY 9, 1920.
1,386,858.
Patented Aug. 9, 1921.
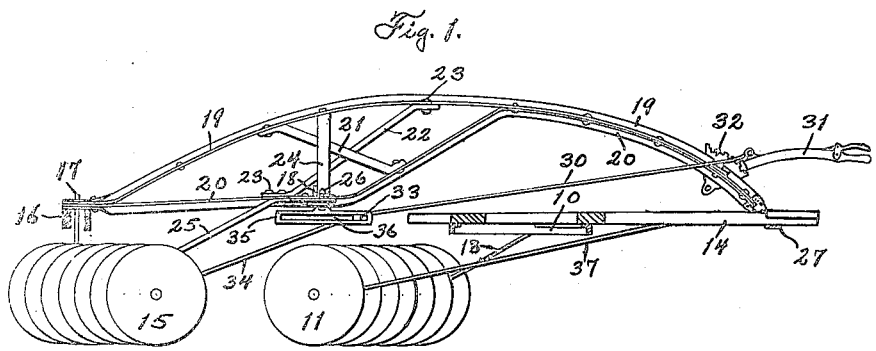
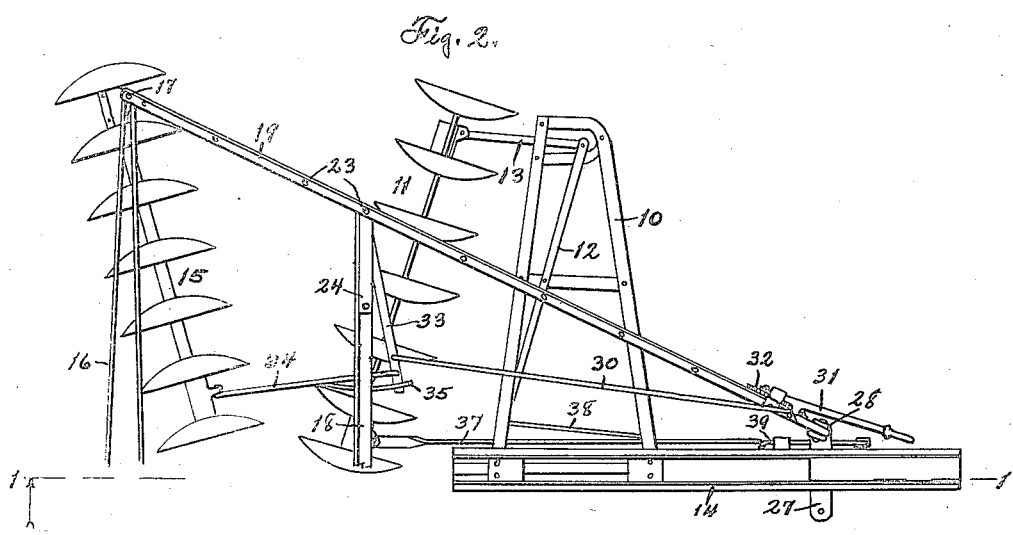
INVENTOR:
F. H. FRENCH
By Earl M. Sinclair
Atty.

UNITED STATES PATENT OFFICE.

FRANK H. FRENCH, OF PRESTON, IOWA.

TANDEM DISK HARROW.

1,386,858. Specification of Letters Patent. Patented Aug. 9, 1921.

Application filed July 9, 1920. Serial No. 394,975.

*To all whom it may concern:*

Be it known that I, FRANK H. FRENCH, a citizen of the United States of America, and resident of Preston, Jackson county, Iowa, have invented a new and useful Tandem Disk Harrow, of which the following is a specification.

The object of this invention is to provide an improved construction for tandem disk harrows and particularly in the matter of connecting the rear harrow to the forward harrow.

A further object of this invention is to provide an improved construction for a draft link for connecting a trailer harrow to a leader harrow.

A further object of this invention is to provide improved means for shifting the gangs of the rear disk harrow.

This invention relates to and is an improvement on the devices illustrated, described and claimed in Letters Patent of the United States Number 1,337,448 granted to me April 20, 1920; and on those illustrated, described and claimed in my companion application filed June 12, 1920, Serial Number 388,520, to which patent and application reference hereby is made.

My inventon consists in the construction, arrangement and combination of elements hereinafter set forth, pointed out in my claims and illustrated by the accompanying drawing, in which—

Figure 1 is a vertical longitudinal section taken substantially on the line 1—1 of Fig. 2. Fig. 2 is a plan of a portion of a disk harrow of tandem type, illustrating my invention.

The leader disk harrow consists, generally of a main frame 10 and disk gangs 11 arranged end to end and pivotally connected to said frame, one only of said gangs being shown in the present instance. The main frame 10 is of a length to extend substantially from end to end of the leader harrow gangs, and evener bars 12, one of which is shown, are pivoted at their centers on opposite sides of said main frame and each of said evener bars has its outer end pivotally connected, by means of a link 13, to the extreme outer end portion of one of the disk gangs 11. A stub tongue 14, composed of spaced angle members, is fixed to and extends forwardly from the center of the frame 10.

The trailer harrow is composed of spaced gangs 15, one of which is shown, pivoted at their outer end portions to a cross frame bar 16 (in this instance of double construction) carrying vertical spindles 17 at its ends. The cross frame bar 16 prevents relative lateral movement of the gangs 15 in use, said gangs being pivoted at their outer ends on the vertical spindles 17. An evener bar 18 is transversely arranged in front of and substantially parallel with the cross frame bar 16, and said evener bar preferably is composed of angle iron.

Draft links are provided, one on each side of the device, one only being shown in the accompanying drawing. Each draft link is composed of two principal members 19, 20 one superposed on the other, each composed of angle iron and in contact throughout portions of their lengths. The upper draft member 19 preferably is arched or crowned practically throughout its length, while the lower member 20 is arched in its forward portion to conform to and is in contact with and rigidly riveted to said member 19. The rear portion of the member 20 is substantially horizontal, while the arched and horizontal portions are connected by an inclined portion. Thus the members 19, 20 are spaced apart vertically for a considerable distance, and crossed braces 21, 22 are mounted in such space and rigidly secured, as by rivets 23, to the said members 19, 20. The braces 21, 22 also may be connected to each other at the point of crossing, by riveting or welding. An inclined brace 24 also may be employed from the central portion of the space between the draft members 19, 20 to the evener bar 18. The extreme rear end portions of the draft members 19, 20 are in contact and secured together, and such portions are formed with a bearing journaled or pivoted on the upwardly projecting end of the spindle 17. A brace 25 is secured to and extends downwardly and rearwardly from the lowermost member 20 and is formed at its rear end with a bearing journaled or pivoted on the lower portion of the spindle 17. The entire arrangement and construction of the draft links as above described produces a very strong and effective means for pivotally connecting the trailer harrow to the leader devices, one that is trussed in such manner as to resist lateral and torsional strains, and a double spaced connection to the spindle 17 is secured. The bar 18 is pivoted at its ends, by bolts 26, to the forward part of the horizontal portion of the respective draft members 20. A plate 27 is arranged transversely of and rigidly secured to the stub tongue 14 and projects at its ends therefrom. U-clips 28, one of which is shown, are swiveled on vertical axes on end portions of the plate 27, and forward end portions of the draft links 19—20 enter said U-clips and are pivoted therein on transversely arranged bolts 29. Thus means is provided for transferring draft force from the stub tongue of the forward harrow to outer end portions of the trailer harrow and for bridging the draft devices over the harrow devices, the arrangement being such that the two harrows may independently turn laterally of the line of advance.

Any desired means may be employed for altering the angularity of the forward and rear harrow units, either by manual actuation or by power transmitted from a tractor as set forth in my companion application above referred to. For this purpose the links 13 of the forward harrow are suitably connected to the actuating devices to shift the units or gangs 11 on vertical axes. Likewise links 30 are employed for shifting the gangs 15 of the rear harrow, said links being pivotally connected at their forward ends to the actuating means, which may be hand levers 31 fulcrumed on forward portions of the draft members 19—20 as shown in the accompanying drawing, segments 32 being secured to said draft members for engagement by said levers. The links 30 do not extend directly to the disk gangs, but are pivoted at their rear ends to levers 33 arranged in transverse horizontal position and fulcrumed at their outer ends on intermedate portions of the draft links 19—20. Preferably the levers 33 are arranged beneath the evener bar 18, on opposite sides of the center thereof, and are fulcrumed on the same bolts, 26, which act as pivots for said evener bar. Other links 34 are pivoted to free end portions of the levers 33 and extend rearwardly and are pivotally connected to inner end portions of the respective gangs 15. A guide bar 35 is secured to and crosses the evener bar 18 and is formed with a longitudinal slot 36 within which the free end of the lever 33 travels.

The inner ends of the evener bars 12 are pivotally connected by links 38, and the inner ends of the forward gangs 11 by links 37, to a hand lever 39 fulcrumed on the stub tongue 14, for simultaneous actuation of said members in shifting the forward gangs. Or said links may be connected to any other suitable operating devices as hereinbefore indicated.

I claim as my invention—

1. In a tandem disk harrow, forward and rear harrow devices and a trussed draft link connecting the two harrow devices, said draft link being composed of two members in superposed relation, one of said members being arched throughout the greater portion of its length, the other member being arched in a portion of its length and in contact with and secured rigidly to the first member, another portion of the second member being spaced materially from the first member, and truss braces rigidly connecting the spaced portions of said members.

2. In a tandem disk harrow, a draft link composed of two superposed members, said members being in contact and rigidly secured together at their ends, portions of said members being arched, portions of said members being spaced materially apart, and truss braces within and secured rigidly to the spaced portions of said members.

3. In a tandem disk harrow, a trailer harrow having gangs pivoted for oscillation on vertical axes, near their outer ends, a lever fulcrumed at one end, a link pivotally connecting the opposite end of said lever to the inner ends of the disk gangs, and an actuating link pivotally connected to the free end of said lever, together with means for operating said actuating link.

4. In a tandem disk harrow, a trailer harrow having a frame, a disk gang pivoted for oscillation on said frame near its outer end, a lever fulcrumed at one end on said frame, a link pivotally connecting the inner end of said lever to the inner end portion of said gang, and means for oscillating said lever.

5. In a tandem disk harrow, a trailer harrow having a frame, a disk gang pivoted on said frame near its outer end, for oscillation on a vertical axis, a lever fulcrumed at its outer end on said frame, a link pivotally connecting the inner end of said lever to the inner end portion of said disk gang, a slotted member receiving and guiding the free end of said lever, and means for oscillating said lever.

Signed at Des Moines, in the county of Polk and State of Iowa, this 30" day of June, 1920.

FRANK H. FRENCH.